April 2, 1974  E. G. LOWRANCE ET AL  3,801,698
REMOVAL OF ACIDIC GASES FROM HYDROCARBON STREAMS
Filed Jan. 18, 1971

INVENTORS
EDGAR G. LOWRANCE
JOHN P. EAMES
BY Morgan, Finnegan, Durham & Pine
ATTORNEYS

United States Patent Office 3,801,698
Patented Apr. 2, 1974

---

3,801,698
REMOVAL OF ACIDIC GASES FROM HYDROCARBON STREAMS
Edgar G. Lowrance, Dedham, and John P. Eames, Framingham, Mass., assignors to Stone & Webster Engineering Corporation, Boston, Mass.
Filed Jan. 18, 1971, Ser. No. 107,056
Int. Cl. C01b *17/56*
U.S. Cl. 423—234     22 Claims

ABSTRACT OF THE DISCLOSURE

An apparatus and process for substantially reducing carbon dioxide and/or hydrogen sulfide levels in a hydrocarbon gas with simultaneous regeneration of reagent materials are disclosed. The process consists of passing the gas through an aqueous alkali metal hydroxide solution, removing any separated hydrocarbons which consist of heavy hydrocarbons, polymerized hydrocarbons and potentially polymerizable hydrocarbons which result upon settling, reacting the aqueous effluent liquid with an acidic reagent, solvent washing the effluent, stripping the acidic gases therefrom and subjecting the resulting aqueous sodium sulfate solution to an electrolytic process. The apparatus used to carry out the process comprises an acidic gas absorbing unit, means for removing the hydrocarbon layer which results upon settling, means for reacting the resulting effluent aqueous liquid, means for solvent washing the effluent, means for stripping the acidic gases and an electrolytic cell to convert soluble alkali metal salts into the corresponding alkali metal hydroxide and acidic reagents.

BACKGROUND OF THE INVENTION

The invention relates to a process and apparatus for the removal of acidic gases such as carbon dioxide and hydrogen sulfide from a hydrocarbon gas. More particularly, it relates to a process for removing these acidic gas components and electrolytically converting the resulting aqueous alkali metal sulfate solution to alkali metal hydroxide and sulfuric acid products. These products can then be recycled to the appropriate stages in the inventive process for reuse. The alkali metal hydroxide is recycled to the alkali metal hydroxide treatment step and the sulfuric acid is recycled to the reaction step. The hydrogen sulfide can be converted to a usable sulfur product.

In the field of petroleum chemistry, it is highly desirable to remove acidic gases such as carbon dioxide and hydrogen sulfide from hydrocarbon gases which contain these materials generally in relatively small quantities. Illustrative of hydrocarbon gases which often contain these impurities are: gases obtained from the cracking of hydrocarbons such as gas, oil, naphtha, butane, ethane, propane, etc. Frequently, naturally occurring hydrocarbons, such as natural gas, contain these same undesirable materials. Their undesirability derives in part from the fact that their acidic nature is prominent under aqueous conditions. This acidic quality can also be detrimental when using the particular gas for its intended use. For instance, they impart corrosive properties and, in the case of hydrogen sulfide, toxic properties. Also, in many instances the presence of these acid gases in hydrocarbon streams is detrimental to subsequent processing of these streams and to the manufacture of chemicals therefrom.

The removal of these unwanted components from a hydrocarbon gas is generally accomplished by scrubbing the gas in a suitable tower with a water solution of a reagent capable of reacting with the acidic gases. Potassium carbonate is frequently used. For example, it reacts with carbon dioxide to form potassium bicarbonate in solution, which may be regenerated by driving off the excess carbon dioxide and either venting it or collecting it for some other usage. However, potassium carbonate is effective for the removal of hydrogen sulfide only in special cases.

Among others, one type of solution frequently employed for scrubbing the gases is a solution containing monoethanolamine. Such a solution can also be regenerated. However, it has three principal drawbacks: relatively high vapor pressure; the fact that it reacts essentially irreversibly with carbonyl sulfide (a common constituent of gas from cracking operations) with resultant substantial loss of the amine; and that it is generally impracticable to remove substantially all the acidic gases using this solvent.

Still another solution which has been used effectively is aqueous sodium hydroxide. This reagent is capable of removing substantially all the acid constituents from gases such as cracked gases and natural gases. Use of this solution, however, suffers from the notable disadvantages that the expensive sodium hydroxide is consumed, it is not recovered, and moreover the waste products from the scrubbing system constitute a potentially serious source of water pollution.

Various removal systems have been devised which are capable of removing these gaseous constituents to various final levels in the treated gases. However, no method has been devised until the present time for substantially complete removal of hydrogen sulfide and/or carbon dioxide from a hydrocarbon gas whereby there is simultaneous stripping of said gases and conversion of $H_2S$ to useful sulfur with efficient and economic regeneration of reagent materials in condition suitable for recycling purposes. It is the general purpose of the present invention to provide a process and apparatus for attaining these ends.

SUMMARY OF THE INVENTION

This invention relates to an improved process and apparatus in which acidic gases such as carbon dioxide and/or hydrogen sulfide in a hydrocarbon gas are substantially reduced with simultaneously regeneration of reagent materials. The basic invention which the present disclosure improves upon is covered in copending application Ser. No. 21,383, filed Mar. 30, 1970, and having a common assignee. That basic case relates to a process which comprises: (a) passing said gas through an aqueous alkali metal hydroxide solutions; (b) reacting the resulting effluent liquid with aqueous sulfuric acid or an aqueous mixture containing sulfuric acid and the corresponding alkali metal sulfate in amounts sufficient to liberate acidic gases such as hydrogen sulfide and carbon dioxide; (c) removing said acidic gases by a stripping operation; and (d) subjecting the resulting aqueous alkali metal sulfate solution to an electrolytic process whereby an aqueous solution of sulfuric acid or an aqueous mixture of sulfuric acid and alkali metal sulfate is collected at the anode and is recycled for utilization in said reaction step and whereby aqueous alkali metal hydroxide is formed at the cathode and is recycled, optionally admixed with alkali metal sulfate, for use in the alkali metal hydroxide treatment step.

The present invention is concerned with specific improvements of that basic process. In particular they consist of:

(e) allowing the aqueous effluent from the alkali metal hydroxide treatment to settle and subsequently removing the separated hydrocarbon or oil phase; and
(f) solvent washing the effluent from the reaction step.

The aforesaid modifications to the basic process offer distinct advantages, for instance, the settling step beneficially removes heavy hydrocarbons which, once removed, allows less solvent to be used in the solvent washing step. These heavy hydrocarbons are usually polymerized or partially polymerized and, therefore, separate relatively rapidly from the aqueous effluent.

The solvent wash removes materials prior to the stripping operation which are potentially harmful to the electrolytic cell. In addition, the solvent extraction step is effected after acidification. Extraction performed under acid conditions, that is, where the pH is less than 7, is beneficial in the instant process and offers definite advantages; namely, it results in a more efficient procedure and permits the removal of unwanted materials more easily.

In connection with the solvent washing modification, it is found that the separated solvent phase can be further treated to remove any entrained aqueous phase. That aqueous phase, once separated, is recycled for additional solvent washing in the solvent washing step. The aforesaid treatment generally comprises a separation step whereby the aqueous phase is allowed to settle out and then withdrawn. The actual withdrawal can be accomplished in any one of several ways.

Another preferred aspect in connection with the solvent washing step is the venting of any vapors which are released during the wash or extraction step directly to the stripping chamber where the stripping operation is carried out. This venting manipulation is effected by the utilization of a conduit or pipe which communicates the solvent wash chamber, at or near the top thereof, with the stripping column near or at the entrance where the solvent-washed effluent enters that chamber.

Another improvement to the basic scheme concerns a filtration procedure used to remove any solid particles which may be found in the effluent after the alkali metal hydroxide treatment. Such solid particles, if not removed, can cause subsequent problems in the overall process. They can be any material usually found in waste caustic, for instance, sand, mill scale, etc. Their removal can be accomplished by any procedure which suitably removes them from the liquid effluent. Suitable means include screens, filters, etc.

This filtering or screening step is usually done right after the sodium hydroxide treatment and, preferably, in conjunction with the settling procedure.

A further improvement to the basic procedure relates to the modification wherein a small portion of acid which is generated from the electrolysis step in the cyclic process is added to the effluent from the alkali metal hydroxide treatment. A sufficient amount of acid is added at this point to insure that the aqueous phase of the effluent liquid flowing to the oil-water settling step has a pH value of less than 7. The addition of this small amount of acid may be very beneficial since it lowers the alkalinity of the effluent, thus reducing the emulsification tendencies of the effluent in the oil-water settling step. As such, the separation of the hydrocarbon phase is facilitated.

Also disclosed and claimed herein is the apparatus which is utilized to carry out the aforesaid inventive process. The apparatus comprises:

(a) an acidic gas absorbing unit having an aqueous alkali metal hydroxide bath therein;
(b) means for removing the separated, hydrocarbon phase which results upon settling of the effluent liquid from the acidic gas absorbing unit;
(c) means for reacting the effluent liquid from the acidic gas absorbing unit;
(d) means for solvent washing the effluent from the reactor;
(e) means for stripping the acidic gases from the solvent-washed effluent liquid; and
(f) an electrolytic cell for receiving the stripped reacted liquid to convert soluble alkali metal salts into the corresponding alkali metal hydroxide and acids.

The last step, the electrolytic conversion, more specifically entails the conversion of an alkali metal sulfate solution to the corresponding alkali metal hydroxide and sulfuric acid. It is the cornerstone of the entire inventive process for it results in the formation of essential reagents offsetting the cost of the regenerating system.

For purposes of this invention, an acidic gas is either hydrogen sulfide, carbon dioxide, carbonyl sulfide which can be reacted with water to form hydrogen sulfide and carbon dioxide, low molecular weight mercaptans or mixtures thereof. These acidic materials are frequently found in hydrocarbon gases. For example, they may be found in refinery gases, natural gases and cracked gases. Accordingly, the present invention contemplates the removal of these materials from any hydrocarbon gas which contains these components. The herein disclosed process is found to be particularly effective in removal of acidic gases from gases formed from cracking hydrocarbons such as gas oil, naphtha, butane, propane and ethane as well as from naturally occurring hydrocarbons which contain the stated acidic materials.

The first treatment or step in the presently disclosed process deals with an aqueous alkali metal hydroxide contact procedure. This is generally effected using well-known techniques familiar to those skilled in this particular art. For instance, a gas which has been obtained from the cracking of gas oil and which has been compressed to about 15 atmospheres above atmospheric pressure is passed through a container or tower which contains a solution of the aqueous alkali metal hydroxide. For purposes of this invention, the phrase alkali metal hydroxide means sodium and potassium hydroxides, and most preferred is an aqueous sodium hydroxide solution.

The preferred method is to have the gas come in contact with the alkali metal hydroxide solution in a substantially countercurrent manner. The gas is passed from the contacting device and may be further processed. The gas so treated is substantially free of any carbon dioxide or hydrogen sulfide. The amount of the alkali metal hydroxide solution is not critical the only requirement being that it is present in sufficient amounts to react with the acid gases present. The acidic gases $CO_2$ and $H_2S$ will be converted to sodium carbonate and sodium sulfide, respectively, and possibly also in part to sodium bisulfide and sodium bicarbonate. Of course, it is understood that the corresponding potassium compounds are produced if potassium hydroxide is used in place of sodium hydroxide. If low molecular weight mercaptans are present, they can be reacted under appropriate conditions to form the corresponding sodium or potassium mercaptides. It is possible to use an excess amount of sodium or potassium hydroxide in relation to the gas to be treated; however, it will be undesirable since such an excess of hydroxide is more costly, will have direct bearing on the amount of reacting agent used in the subsequent treatment and will make necessary a larger electrolytic conversion step. For these reasons, it is desirable to use the least amount of sodium or potassium hydroxide which is required to remove the hydrogen sulfide and carbon dioxide from the gas. From a practical point of view, a small excess of sodium or potassium will most likely be present.

This slight excess of sodium hydroxide, for example, will tend to preclude the formation of sodium bisulfide and sodium bicarbonate. Alternatively, if no excess is present, then theoretically sodium bisulfide and sodium bicarbonate could be produced along with sodium sulfide and sodium carbonate.

The above-described chemical reactions can be shown by the following chemical equations:

$$H_2S + NaOH \to Na_2S + 2H_2O$$
$$CO_2 + 2NaOH \to Na_2CO_3 + H_2O$$
$$Na_2S + H_2S \to 2\ NaHS \text{ (Prevented with excess } OH^-\text{)}$$
$$Na_2CO_3 + CO_2 + H_2O \to 2NaHCO_3$$
$$\text{(Prevented with excess } OH^-\text{)}$$
$$H_2S + NaOH \to NaHS + H_2O$$
$$CO_2 + NaOH \to NaHCO_3$$
$$\underset{\substack{\text{(methyl} \\ \text{mercaptan)}}}{CH_3SH} + NaOH \to \underset{\substack{\text{sodium methyl} \\ \text{mercaptide}}}{CH_3SNa} + H_2O$$

It must be recognized that the above shown reaction sequence applies equally when potassium hydroxide is used, the only difference being the replacement of sodium ion by potassium ion. For the sake of convenience, the ensuing description shall be limited to sodium with the understanding that if potassium hydroxide is used in place of sodium hydroxide, the corresponding potassium compounds are formed.

At this stage of the herein disclosed novel process, one has an aqueous solution containing sodium carbonate and sodium sulfide and possibly, in addition, sodium bisulfide and sodium bicarbonate. It is, of course, apparent that these substances in the aqueous phase exist primarily in the ionic form.

The next step is an oil-water separation step in which heavy hydrocarbons (oil layer) of the kind described earlier appear. After the effluent from the sodium hydroxide treatment is allowed to settle for a short duration of time, the oil layer is removed by a separation technique. By this modification, any suspended organic impurities of the kind described above are removed from the effluent by a settling technique. Once the unwanted organic impurities are withdrawn, they may simply be discarded.

The next step is the reacting of the solution containing the above mentioned constituents. Its purpose is to convert the sodium sulfide and sodium bisulfide (if present) to sodium sulfate and hydrogen sulfide. The reaction also relates to the reaction which occurs between sodium carbonate and sodium bicarbonate, if present, and sulfuric acid to yield sodium sulfate and carbon dioxide. Any low molecular weight sodium mercaptide which may be present is converted to sodium sulfate and the corresponding mercaptan.

The chemical reactions which take place during the reaction step can be shown by the following equations:

$$Na_2S + H_2SO_4 \to Na_2SO_4 + H_2S$$
$$2NaHS + H_2SO_4 \to Na_2SO + H_2S$$
$$Na_2CO_3 + H_2SO_4 \to Na_2SO_4 + H_2O + CO_2$$
$$2NaHCO_3 + H_2SO_4 \to Na_2SO_4 + 2H_2O + 2CO_2$$
$$2CH_3SNa + H_2SO_4 \to 2CH_3SH + Na_2SO_4$$

The next step is a solvent wash carried out on the effluent which has undergone the acid reaction step. The solvent wash is an extraction method wherein the aqueous effluent is intimately mixed with a solvent. The solvent utilized in this step is a substantially water-immiscible organic solvent. Highly preferred solvents include those which have boiling points no higher than that of a gas oil, such as a gas oil and naphtha-type solvents. However, other solvents having boiling points within or below the range described above are also contemplated. During the intimate contacting, any organic impurities which may have been carried along in the process will be effectively removed and, consequently, will not be present during the electrolysis procedure. The disadvantages of their presence during that step are as follows: the effectiveness of the cell is reduced; the life of the cells is decreased and it may be necessary to change the electrodes more often.

During the reaction step, $H_2S$ gas forms in situ and may be carried along through the solvent washing step. Similarly, carbon dioxide may be entrained in the aqueous effluent and possible low molecular weight mercaptans. These materials are removed in the stripping step. The actual stripping operation is effected in the acidic gas stripper chamber wherein the gaseous components consisting of carbon dioxide and hydrogen sulfide are stripped under moderate to low pressure. A particularly desirable embodiment of this invention relates to a procedure whereby $H_2S$ which is removed from solution is converted to free sulfur, a valuable chemical raw material.

The final step is concerned with an electrolytic conversion in which the resulting aqueous sodium sulfate solution stripped free of the acidic components is optionally filtered and then subjected to an electrolytic process. The electrolytic method converts the aqueous sodium sulfate solution to the corresponding acid, sulfuric acid. The process utilized may be essentially the same as that described in Tirell et al. U.S. 3,135,673 which employs a cell having three compartments containing an ion-exchange membrane selectively permeable to cations defining the cation compartment and a spaced acid-resistant hydraulically permeable diaphragm defining the anode chamber. To the center compartment is passed the salt solution. Deionized water or other solutions are passed into the cathode compartment and an electric current is impressed upon the cell causing migration of cations of the electrolyte through the cation permselective membrane into the cathode compartment where combination with hydroxyl ions produced by the electrolysis of water at the cathode yields the corresponding metal hydroxide. Anions and to a lesser extent cations of the electrolyte pass through the hydraulically permeable diaphragm into the anode compartment where combination with hydrogen ions produced by the electrolysis of water at the anode produces the corresponding acid which is admixed with the salt fed to the cell.

The present invention is not limited to the use of the three-compartment cell described in the preceding paragraph. A two-compartment cell of the type described in Mayland et al., U.S. 3,485,743, may be used and there are numerous other electrolytic cells which are applicable in the practice of this invention. It must be understood that the constituents in and compositions of the various circulating streams are dependent on the characteristics of the particular electrolytic cell and on the reagents employed. Other changes in the cyclical flow of the fluids within the system may be called for depending on the nature of the electrolytic cell but these changes will be apparent to anyone skilled in the art.

DESCRIPTION OF THE DRAWINGS

The invention will be described with reference to the accompanying drawings which will give a clearer understanding of the invention and preferred method of practicing the invention.

DESCRIPTION OF THE PREFERRED EMBODIMENT

Figure 1:
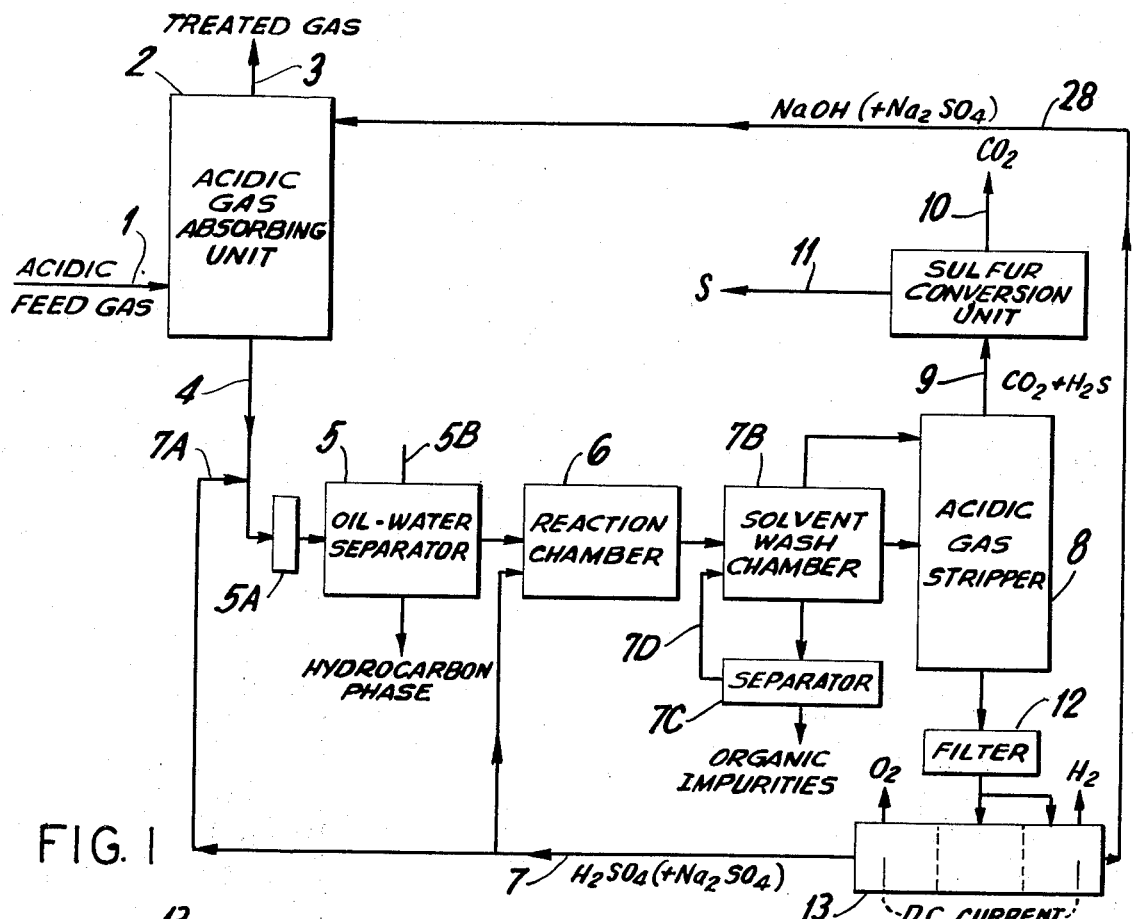
FIG. 1 is a flow sheet depicting the overall cyclic process in a sequential manner and FIG. 2 is a schematic diagram of the electrolytic cell system of the invention.

The flow sheet shown in FIG. 1 is the preferred embodiment of the invention. The cyclic process contemplates the treatment of a hydrocarbon gas containing acidic gases with a caustic solution, for instance, sodium hydroxide, removal of the hydrocarbon phase, reaction of the resulting effluent liquid, solvent washing of effluent, removal of hydrogen sulfide and carbon dioxide by a stripping operation, regeneration of reagents by means of an electrolytic process and production of sulfur from the hydrogen sulfide.

In general, the apparatus includes an acidic gas absorbing unit, means for substantially removing heavier organic hydrocarbons from the effluent liquid withdrawn from the absorbing unit (oil-water separator), a reaction chamber which may be simply a section of pipe line, a solvent wash chamber, an acidic gas stripping unit and an electrolytic cell. For purposes of clarity and simplicity, heat exchange apparatus and pumps are not shown in FIG. 1 or described in this specification but their use will be obvious to those skilled in the art.

Referring now to FIG. 1, which is diagrammatically illustrative of a simplified system suitable for substantially reducing hydrogen sulfide and carbon dioxide levels from a hydrocarbon gas such as that obtained from hydrocarbon cracking units or naturally occurring hydrocarbons which contain these substances, the process gas 1 is delivered to the acidic gas absorbing unit 2. This unit is preferably a scrubbing tower in which the aqueous sodium hydroxide and sodium sulfate contained therein is contacted with the acidic feed gas countercurrently. In this manner, the feed gas is assured of intimate mixing with the absorber solution of aqueous sodium hydroxide and sodium sulfate. The scrubbed or treated gas 3 which is substantially free of acidic gas components is piped from the absorber for subsequent transportation or processing.

The spent effluent liquid 4 coming from the acidic gas absorbing unit is collected at the bottom of the tower and is carried out by a conduit to the oil-water separator 5. At this stage, the effluent liquid which contains sodium sulfide and sodium carbonate, and possibly sodium bisulfide and sodium bicarbonate, is permitted to settle so that suspended hydrocarbons which form as a separate layer can be withdrawn. Prior to the oil-water separation step, the effluent obtained after sodium hydroxide treatment is filtered either through a screen or filter 5A to remove any solid particles. The oil-water separator is provided with a vent line 5B from which gases released from the effluent as a result of the reduction in pressure may be vented from the separator.

The effluent liquid can now be reacted with an acid, preferably sulfuric acid, in a reaction chamber 6 or section of pipe between the point of admixture of the two liquid streams and the solvent wash chamber 7B. The sulfuric acid for this purpose (mixed with sodium sulfate) 7 is carried by a conduit from the reaction chamber of the effluent liquid. The reaction chamber, therefore, receives an aqueous solution of sulfuric acid which contains some sodium sulfate and the effluent liquid which comprises sodium sulfide, sodium carbonate and possibly sodium bisulfide and sodium bicarbonate as well in aqueous solution. Some of the sulfuric acid may be transported via conduit 7A to a point just before the effluent reaches the settling tank.

The chemical reactions which occur in the reaction chamber have been shown earlier and relate to the production of hydrogen sulfide from the sodium sulfide and sodium bisulfide constituents while carbon dioxide is formed from the sodium carbonate and sodium bicarbonate components. Both gases form in situ as the reaction takes place.

The effluent is then transferred to solvent wash chamber 7B where an intimate mixture of solvent and effluent is formed. The formation of an intimate contacting may be assisted by stirring. The solvent (oragnic layer) to be withdrawn from the system is separated and conveyed via conduit to a second separator 7C where the material is further settled to remove any entrained aqueous material which is then recycled to the solvent wash chamber by means of conduit 7D. The organic layer remaining after separation is discarded.

In place of the solvent washing procedure, an adsorbent treatment may be used to achieve the same results. In this latter method, the effluent is passed through a bed of adsorbent material such as carbon, charcoal, clay or silica.

The aqueous phase from the wash chamber is then transferred by conduit to the acidic gas stripper 8. Upon proper conditions such as moderate or low pressures and/ or the application of heat, the gaseous components $CO_2$ and $H_2S$ 9 are stripped from the solution and may be vented to the atmosphere. A preferred embodiment of the instant invention, however, concerns the subsequent treatment of the stripped acidic gases to convert the $H_2S$ to a salable product; namely, sulfur 11. Accordingly, there results the formation of a commercially desirable product from an undesirable component present as an impurity in the original gas feed. Gases from which most of the sulfur has been removed are vented through line 10 from the equipment.

The aqueous solution which remains after the stripping procedure is essentially a sodium sulfate solution. It is collected at the bottom of the acidic gas stripper and is carried by conduit to the electrolytic cell 13 in order to effect the last step of the cyclic process. Prior to the electrolytic conversion step, the sodium sulfate solution can be filtered using an ordinary filtering apparatus 12. In many instances, a filtering step will be unnecessary. However, to insure minimal contamination in the electrolytic cell, it is generally advisable.

Figure 2:
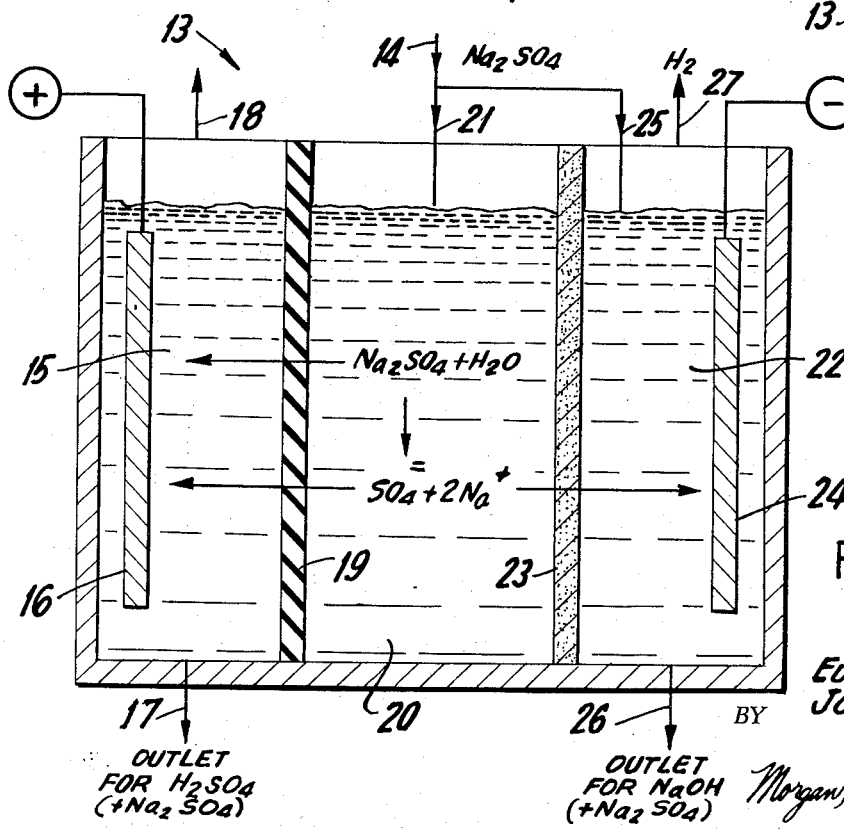

The sodium sulfate solution is transferred to the center compartment of a three-compartment electrolytic cell. Through conduits 14 and 21 and to the cathode compartment of said cell through conduits 14 and 25. A suitable construction for the electrolytic cell is described in FIG. 2. It contains an anode compartment 15 which has an acid resistant anode 16 and is provided with an outlet 17 for the anolyte effluent product, a solution of sulfuric acid and sodium sulfate, and an outlet 18 for the gaseous anode product, oxygen. The anode compartment 15 is separated from the center compartment by means of an acid resistant hydraulically permeable non-permselective diaphram 19. The center compartment 20 contains an inlet 21 through which the sodium sulfate solution is introduced. The cathode compartment 22 is separated from the center compartment 20 by a cation-exchange membrane 23 selectively permeable to cations. The cathode compartment 22 is provided with a cathode 24 and an inlet 25 through which a portion of the sodium sulfate solution is added. In place of sodium sulfate, water alone can be used. However, in order to prevent dilution of the circulating solutions, it is preferred to use sodium sulfate. It is obvious that, if one adds sodium sulfate to the cathode compartment, the sodium hydroxide which is collected is admixed with a sodium sulfate solution. An outlet in the cathode compartment serves to withdraw the catholyte effluent product sodium hydroxide 26. Another outlet 27 which appears at the top of the cathode compartment 22 serves as an exit pipe for withdrawal of the gaseous cathodic product, hydrogen.

In the operation of this electrolytic process, a concentrated sodium sulfate solution is introduced into the cell through inlet 21 at a rate and pressure sufficiently high so that the passage of said sodium sulfate through the porous diaphram is at a rate sufficiently rapid to substantially curtail the migration of hydrogen ions from anode toward the cathode.

Simultaneously, sodium sulfate solution or water is passed into the cathode compartment at a rate corresponding to the concentration of sodium hydroxide desired in the cathode effluent product, and a direct electric current is impressed upon the cell. The cationic constituents, for example, sodium ions, pass through the cation-exchange membrane into the cathode compartment where combination with hydroxyl ions produced at the cathode by the electrolysis of water results in the formation of sodium hydroxide which may then be withdrawn from the cathode compartment. The sodium sulfate in the center compartment now having been partially depleted of its sodium ions passes through the diaphragm into the anode compartment where combination of the sulfate anions with hydrogen ions produced by electrolysis of water at the anode provides sulfuric acid which is withdrawn together with unreacted sodium sulfate at the provided outlet. Generally, the sulfuric acid solution will contain about equal concentrations of sulfuric acid and sodium sulfate.

The reagent materials required for the earlier stages in the process are now regenerated and can be carried by conduits to the appropriate locations in the cyclic process. For instance the sodium hydroxide which may contain some sodium sulfate is transferred to the acid gas absorbing unit for further treatment of acidic feed gas. The sulfuric acid solution containing sodium sulfate is returned to mix with and react with the liquid from the absorber which has been treated to remove organic impurities. It may be returned directly to the reaction chamber or may be placed in the line with the effluent liquid and the mixture subsequently carried to the reaction chamber.

The invention in its broader aspects is not limited to the specific steps, methods, compositions and improvements shown and described herein, but departures may be made within the scope of the accompanying claims without departing from the principles of the invention.

What is claimed is:

1. In a cyclic process for substantially reducing the carbon dioxide and/or hydrogen sulfide content present as acidic gases in a gas obtained from the cracking of a hydrocarbon selected from the group consisting of gas oil, naphtha, ethane, propane and butane, and said gas further containing undesirable hydrocarbons therein, with simultaneous regeneration of reagent material which comprises:
    (a) passing said cracked gas containing the acidic gases and the undesirable hydrocarbon through an aqueous alkali metal hydroxide solution to produce an aqueous effluent containing the undesirable hydrocarbon in an entrained state;
    (b) reacting the resulting aqueous effluent with aqueous sulfuric acid or an aqueous mixture containing sulfuric acid and the corresponding alkali metal sulfate in an amount sufficient to liberate acidic gases consisting essentially of hydrogen sulfide and/or carbon dioxide;
    (c) removing said acidic gases by a stripping operation; and
    (d) subjecting the resulting aqueous alkali metal sulfate solution to an electrolytic process whereby aqueout sulfuric acid or an aqueous mixture of sulfuric acid and alkali metal sulfate is collected at the anode and is recycled for utilization in said reaction step and aqueous alkali metal hydroxide which forms at the cathode is recycled for use in the alkali metal hydroxide treatment step; the improvements which comprise
    (e) allowing the effluent from the alkali metal hydroxide treatment to settle and subsequently removing the separated hydrocarbon phase from the aqueous phase; and
    (f) solvent washing the effluent from the reaction step prior to the stripping operation.

2. The process according to claim 1 wherein said aqueous alkali metal hydroxide solution is aqueous sodium hydroxide.

3. The process according to claim 2 wherein said aqueous sodium hydroxide solution contains sodium sulfate.

4. The process according to claim 2 wherein said sodium hydroxide which forms at the cathode contains sodium sulfate.

5. The process according to claim 2 wherein to the cathode compartment involved in the electrolytic process is added aqueous sodium sulfate in an amount sufficient to maintain the electrolytic membrane free from solids.

6. The process according to claim 2 wherein said effluent liquid contains a small amount of sodium hydroxide.

7. The process according to claim 2 wherein said effluent liquid from the sodium hydroxide treatment contains sodium bisulfide and/or sodium bicarbonate.

8. The process according to claim 1 wherein prior to settling step (e), the effluent is filtered to remove solid particles.

9. The process according to claim 1 wherein a small amount of aqueous sulfuric acid collected from the electrolytic process is added to the aqueous effluent immediately after the alkali metal hydroxide treatment step.

10. The process according to claim 1 wherein the solvent used in said solvent washing step (f) is a substantially water-immiscible organic solvent.

11. The process according to claim 10 wherein said organic solvent is a hydrocarbon having a boiling point no higher than that of a gas oil.

12. The process according to claim 11 wherein said hydrocarbon solvent is a naphtha.

13. The process according to claim 11 wherein said hydrocarbon solvent is a gas oil.

14. The process according to claim 1 wherein the separated solvent phase resulting from solvent washing step (f) is treated to remove any entrained aqueous phase, said aqueous phase being recycled for further solvent washing.

15. The process according to claim 1 wherein vapor released from solvent wash step (f) is vented directly to the stripping operation.

16. The process according to claim 2 wherein said sodium hydroxide treatment step consists of contacting said gas substantially countercurrently with said sodium hydroxide solution.

17. The process according to claim 1 wherein the liberated hydrogen sulfide from the stripping operation is converted to sulfur.

18. The process according to claim 2 wherein the aqueous sodium sulfate from the stripping operation is filtered before it is subjected to the electrolytic process.

19. The process according to claim 1 wherein said electrolytic process is carried out in an electrolytic cell capable of converting soluble alkali metal salts into their corresponding alkali metal hydroxides and acids.

20. The process according to claim 19 wherein said soluble alkali metal salt is sodium sulfate which is converted to sodium hydroxide and sulfuric acid.

21. The process according to claim 19 wherein said electrolytic cell is a three compartment cell comprising a cathode compartment, a center compartment and an anode compartment, the cathode compartment being separated from the center compartment by a cation selective ion exchange membrane and the center compartment being separated from the anode compartment by a fluid-permeable diaphram.

22. The process according to claim 1 wherein instead of solvent washing the effluent, step (f) comprises contacting the effluent from the reaction step with an adsorbent.

References Cited
UNITED STATES PATENTS

| | | | |
|---|---|---|---|
| 3,475,122 | 10/1969 | McRae et al. | 23—178 |
| 3,344,050 | 9/1967 | Mayland et al. | 23—4 X |
| 1,132,679 | 3/1915 | Murray et al. | 23—121 |
| 2,497,954 | 2/1950 | McCulley | 23—2 R |

EARL C. THOMAS, Primary Examiner

U.S. Cl. X.R.

423—245; 204—98, 104, 180 P

UNITED STATES PATENT OFFICE
CERTIFICATE OF CORRECTION

Patent No. 3,801,698          Dated April 2, 1974

Inventor(s) Edgar G. Lowrance et al

It is certified that error appears in the above-identified patent and that said Letters Patent are hereby corrected as shown below:

Column 2, line 43, change "simultaneously" to -- simultaneous --

Column 2, line 49, change "solutions" to -- solution --

Column 5, line 4, entire line should read -- $H_2S + 2NaOH \rightarrow Na_2S + 2H_2O$ --

Column 7, line 57, change " oragnic" to -- organic --

Column 8, line 54, insert -- the -- before "anode".

UNITED STATES PATENT OFFICE
CERTIFICATE OF CORRECTION

PO-1050
(5/69)

Patent No. 3,801,698        Dated April 2, 1974

Inventor(s) Edgar G. Lowrance et al

It is certified that error appears in the above-identified patent and that said Letters Patent are hereby corrected as shown below:

Column 5, line 50, entire line should read --

$$2NaHS + H_2SO_4 \longrightarrow Na_2SO_4 + 2H_2S$$ -- .

Signed and sealed this 8th day of October 1974.

(SEAL)
Attest:

McCOY M. GIBSON JR.
Attesting Officer

C. MARSHALL DANN
Commissioner of Patents